United States Patent [19]

Rothbauer et al.

[11] Patent Number: 5,958,206

[45] Date of Patent: Sep. 28, 1999

[54] PROCESS FOR PRODUCING A CORROSION AND WEAR-RESISTANT OXIDE LAYER WITH LOCALLY REDUCED LAYER THICKNESS ON THE METAL SURFACE OF A WORKPIECE

[75] Inventors: Horst Rothbauer, Hattersheim; Ewald Renner, Sailauf, both of Germany

[73] Assignee: ITT Manufacturing Enterprises Inc., Wilmington, Del.

[21] Appl. No.: 08/849,610

[22] PCT Filed: Nov. 18, 1995

[86] PCT No.: PCT/EP95/04544

§ 371 Date: Aug. 21, 1997

§ 102(e) Date: Aug. 21, 1997

[87] PCT Pub. No.: WO96/17111

PCT Pub. Date: Jun. 6, 1996

[30] Foreign Application Priority Data

Dec. 1, 1994 [DE] Germany .............................. 44 42 792

[51] Int. Cl.$^6$ ..................................................... C25D 11/02
[52] U.S. Cl. ......................... 205/96; 204/224 R; 204/279; 204/286; 204/DIG. 7; 205/136; 205/324
[58] Field of Search .............................. 205/96, 136, 324; 204/224 R, DIG. 7, 279, 286

[56] References Cited

U.S. PATENT DOCUMENTS

| 3,361,662 | 1/1968 | Sutch | 204/224 |
|---|---|---|---|
| 3,619,382 | 11/1971 | Lupinski | 204/30 |
| 3,880,725 | 4/1975 | Van Raalte et al. | 204/15 |
| 4,304,641 | 12/1981 | Grandia et al. | 204/23 |
| 5,135,636 | 8/1992 | Yee et al. | 205/96 |
| 5,173,170 | 12/1992 | Brown et al. | 205/96 |

FOREIGN PATENT DOCUMENTS

| 523677 | 1/1993 | European Pat. Off. . |
|---|---|---|
| 2043686 | 2/1971 | France . |
| 458284 | 4/1928 | Germany . |
| 2919113 | 11/1979 | Germany . |
| 467868 | 3/1969 | Switzerland . |
| 96 17111 | 6/1996 | WIPO . |

*Primary Examiner*—Kathryn Gorgos
*Assistant Examiner*—William T. Leader
*Attorney, Agent, or Firm*—Rader, Fishman & Grauer PLLC

[57] ABSTRACT

The invention relates to a method to produce an oxide coating that protects against corrosion and wear on the metal surface of a workpiece, more specifically, for the metal surface of a body for accepting a valve, wherein with the use of a cathode, the workpiece, as an anode, is subjected to constant or pulsating direct current in an electrolyte, with an auxiliary anode, which is resistant to the electrolyte, being attached to the workpiece before the workpiece is dipped into the electrolyte, which discharges the anodizing current at locations where no anodized coating is required or only a limited anodized coating is required.

17 Claims, 2 Drawing Sheets

PROCESS FOR PRODUCING A CORROSION AND WEAR-RESISTANT OXIDE LAYER WITH LOCALLY REDUCED LAYER THICKNESS ON THE METAL SURFACE OF A WORKPIECE

This is a national stage application of PCT/EP95/04544, filed Nov. 18, 1995.

FIELD OF THE INVENTION

The invention relates to a method to produce an oxide coating on the metal surface of a workpiece that protects against corrosion and wear and has a selectively reduced coating thickness and a device to carry out the method.

BACKGROUND OF THE INVENTION

It is already known from the technical literature that anodic oxidation may be carried out to produce an oxide coating which protects against corrosion and wear on the metal surface of certain metal alloys. This process has great technical significance for the treatment of metal surfaces which may be coated in this way with an oxide coating which protects against corrosion and wear (for more about this, compare Kraftfahrtechnisches Taschenbuch, Bosch, 21st Edition). Anodic oxidation is utilized, above all, in the surface treatment of an aluminum workpiece to reinforce the natural oxide film and thus to achieve a so-called anodized coating.

An aluminum part is wired as an anode and, together with a counter-electrode, receives a constant or pulsating direct current in an electrolyte. The transformation (oxidation) of metallic aluminum to aluminum oxide forms a coating on the surface, which protects against corrosion and wear. The structure and thickness of the coating are essentially a function of time, temperature and current density.

As a rule, the aluminum oxide coating is very hard and brittle, and therefore it cannot be prevented from chipping, for a corresponding exterior influence of force on the anodized coating, which is undesirable in certain applications.

It is also known that the anodizing of special locations of a component may be prevented or limited to a minimum by means of masking with an insulating lacquer or with protective screens.

However, these methods are very costly for industrial scale manufacture and cannot be automated for the application described, or may be automated only at great cost.

OBJECT OF THE INVENTION

Consequently, the purpose of the invention is to indicate a method and a device of the aforementioned type, which do not have the described disadvantages and which permit, on one hand, an oxide coating which protects against corrosion and wear at the desired locations of the metal surface but, on the other hand, limits or prevents the build-up of an anodized coating at locations of the workpiece where a chipping-off of the anodized coating must be prevented under all circumstances.

SUMMARY OF THE INVENTION

This problem is solved in that an auxiliary anode that is resistant to the electrolyte is attached to the workpiece, to which the current acting upon the workpiece may be partially dissipated. Consequently, it is possible to limit the thickness of the oxide coating in said region, or even to prevent same. Consequently, mechanical stress acting upon the nonanodized locations may be absorbed without danger. A device to carry out the method comprises a cover which is adapted to be placed on the workpiece and to which is attached at least one auxiliary anode, which is connected to a direct-current source in a circuit which is electrically parallel to the workpiece.

Additional objectives, features, advantages and possibilities for use of the present invention are obtained from the following description of an embodiment.

DETAILED DESCRIPTION OF THE DRAWING

Figure 1:
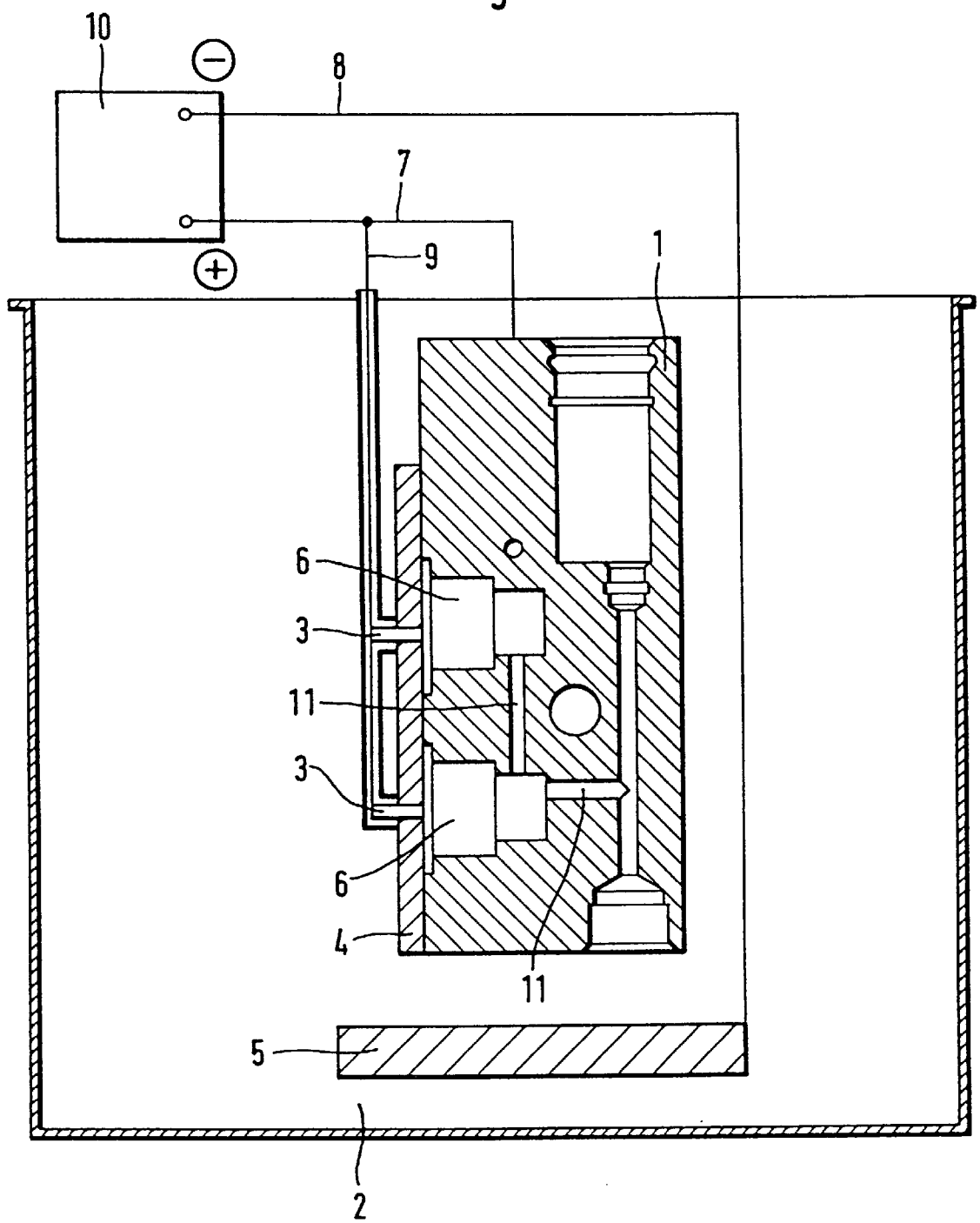
FIG. 1 shows the principle construction to produce an oxide coating to protect against corrosion and wear on a metal surface of a workpiece.

FIG. 1 shows the principle construction to produce an oxide coating to protect against corrosion and wear on the metal surface of a workpiece 1, which is dipped in an anodizing electrolyte. The workpiece 1 consists of an aluminum alloy and, as a positive pole (anode), is connected to a direct current source 10 by means of an electrical lead 7. The negative electrode (cathode 5) consists, e.g., of a lead plate which, in turn, is connected to the direct current source 10 by means of an electrical lead 8. The workpiece 1 is covered in the region of the openings 6 (drilled holes for accepting valves), which must not be anodized, with a plate-shaped protective cover 4. The auxiliary anodes 3 are attached to a protective cover 4 such that they are positioned in the region of the openings 6 and are connected to the anodizing electric circuit by means of the electrical lead 9. Thus, they can dissipate the anodizing current, preventing the anodizing current from spreading through the drilled channel holes 11 into the drilled holes for accepting valves (openings 6).

Figure 2:
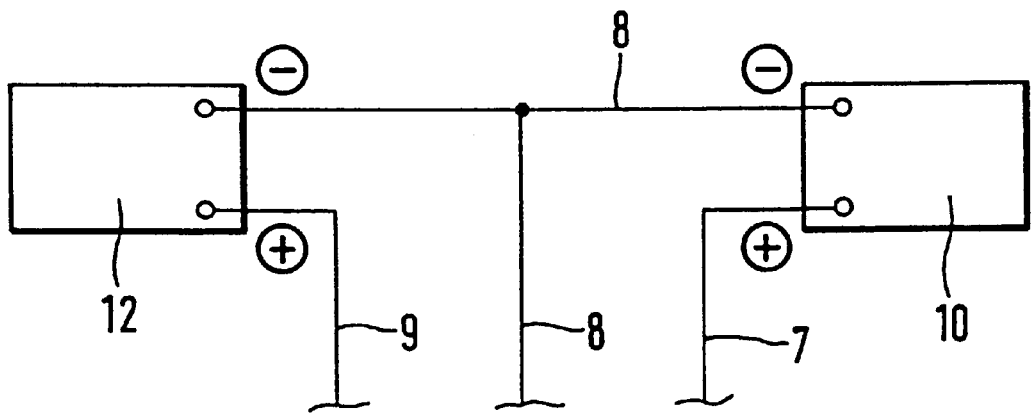
FIG. 2 shows a direct-current source with a separate rectifier to regulate the current in a device according to FIG. 1.
Figure 3:
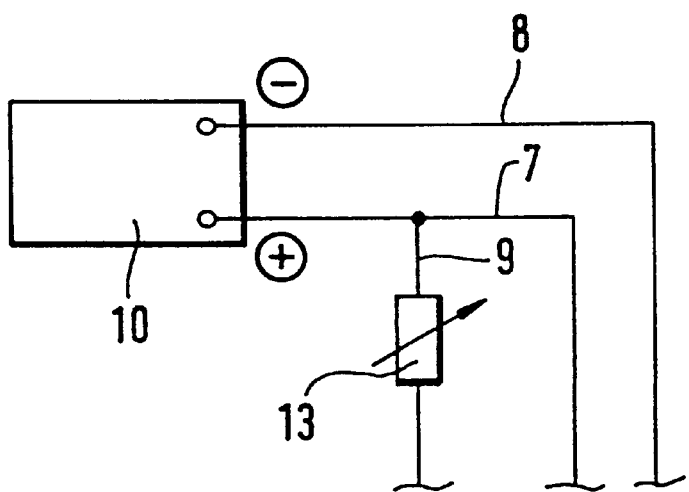
FIG. 3 shows a direct-current source with a variable resistor to regulate the current in a device according to FIG. 1.

In addition to the details shown in FIG. 1, it is also possible, however, to regulate the current to be dissipate by means of the auxiliary anodes by means of a separate rectifier 12 or by means of a variable resistor 13 on the lead 9 (see FIG. 2 and FIG. 3).

For this purpose, the positive pole of the rectifier 12 is connected to the lead 9 leading to the auxiliary anode 3, while the negative pole of the rectifier 12 is connected to the lead 8, which is connected to the cathode 5.

When a variable resistor 13 is used, it is wired between the positive pole of the direct current source 10 and the lead 9 leading to the auxiliary anode 3.

The auxiliary anodes should consist of a material (e.g., platinum, platinized titanium, graphite, conductive plastic) which is resistant under anodic polarization in an anodizing electrolyte (e.g. sulfuric acid).

The material of the cover on which the auxiliary anodes are attached ought to consist of an electrically nonconductive material (e.g. plastic) or of an electrically conductive material (e.g., titanium) which becomes electrically passive during anodic polarization in an anodizing electrolyte, and it likewise must be resistant to the anodizing electrolyte.

The plate-shaped cover 4 which, on one hand, assumes the function of a body which closes the openings 6 with respect to the electrolyte 2, also serves, on the other hand, to position the auxiliary anodes 3 on the workpiece 1 during the anodizing process in the electrolyte 2. Consequently, the auxiliary anodes 3 are a component of the cover 4 and are carried by the cover 4. It is preferable for the cathode 5 to be manufactured of lead or aluminum, and it is arranged in the anodizing electrolyte. The workpiece 1 forms the body of a valve receiver which, as a monolithic block, features several channels and openings. After anodizing of the metal surface has been carried out, the openings 6 of the workpiece 1, closed by means of the cover 4, accept several valves which must be inserted at a relatively large insertion force and which, as a result of an anodized coating which is reduced by means of the auxiliary anodes 3, may be pressed into the openings 6 without wear by friction. Consequently, possible contamination of the channels resulting from chipped-off pieces of coating is prevented. This also renders unnecessary the otherwise necessary finishing measures to the workpiece 1, which would require, more specifically, machining and costly rinsing processes of the entire channel system. An additional advantage of the invention is obtained by means of an exact maintaining or control of the dimensional tolerances of the workpiece 1, since, on one hand, openings 6 worked to a precise fit in order to accept valves do not require anodizing or only require slight anodizing; on the other hand, the possibility to control the anodizing current permits various configurations, in accordance with need, of the coating thickness of the remaining metal surface, which is covered by an anodized coating. The number of required auxiliary anodes 3 is set to the number of openings 6 of the valves to be inserted. Since, as a rule, the openings 6 are arranged in two parallel rows, a plate-shaped cover 4 results, with auxiliary anodes 3 likewise parallel to each other in rows.

We claim:

1. A method for producing an oxide coating on a metal surface of a workpiece, which comprises:

providing a cathode in an anodizing electrolytic bath;

providing said workpiece, as an anode, in said anodizing electrolytic bath;

providing at least one auxiliary anode in said anodizing electrolytic bath in a vicinity of a portion of said workpiece where said oxide coating is undesirable, attaching said at least one auxiliary anode to a cover that is electrically passive in said electrolytic bath, and placing the cover on said workpiece, whereby said portion of said workpiece is closed by said cover, but said at least one auxiliary anode is not in contact with said workpiece;

subjecting said workpiece and said cathode to a first direct current source; and preventing formation of said oxide coating in said portion of said workpiece by subjecting said at least one auxiliary anode to the first direct current source or to a second direct current source.

2. The method of claim 1, wherein the at least one auxiliary electrode is connected to a second direct current source and at least one of said first and said second direct current source provides a pulsating current.

3. The method of claim 1, wherein a single direct current source is utilized, and said at least one auxiliary anode is wired in parallel with said workpiece.

4. The method of claim 1, wherein said electrolytic bath comprises sulfuric acid.

5. The method of claim 1, wherein said cathode comprises a lead plate.

6. The method of claim 1, wherein said at least one auxiliary anode comprises at least one of platinum and platinized titanium.

7. The method of claim 1, wherein the portion of said workpiece where said oxide coating is undesirable is an opening, and said at least one auxiliary anode is aligned with said opening.

8. The method in accordance with claim 1, wherein the direct current applied to the auxiliary anode is controlled by means of a rectifier.

9. The method in accordance with claim 1, wherein the direct current applied to the auxiliary anode is controlled by means of a variable resistor.

10. A device for producing an oxide coating on a metal surface of a workpiece, which comprises:

a cover which is electrically passive in an electrolytic bath, and is adapted to be placed on a predetermined portion of the workpiece where said oxide coating is undesirable;

at least one auxiliary anode, attached to said cover in a vicinity of said predetermined portion;

a first direct-current source in a circuit which is electrically parallel to the workpiece, and connected to said auxiliary anode; and a connection from said first direct-current source to said workpiece or a second direct-current source connected to said workpiece, wherein said cover is configured to electrically separate said workpiece from said auxiliary anode when the cover is placed on the predetermined portion of the workpiece, and said cover facilitates reduction of said oxide coating by said auxiliary anode at said predetermined portion.

11. The device of claim 10, wherein the cover is adapted to be placed on a predetermined area which is an opening in the workpiece.

12. The device of claim 10, wherein the cover has essentially the form of a level plate.

13. The device of claim 12, wherein said second direct-current source is provided with a separate current-controlling rectifier in the auxiliary anode electric circuit.

14. The device of claim 12, wherein said second direct-current source is provided with a current-controlling variable resistor in the auxiliary anode electric circuit.

15. The device of claim 12, wherein the cover accepting the auxiliary anode consists of titanium.

16. The device of claim 12, wherein the cover accepting the auxiliary anode consists of plastic.

17. The device of claim 10, wherein a single direct current source is provided.

* * * * *